United States Patent [19]

Kostrzewski

[11] Patent Number: 5,072,948

[45] Date of Patent: Dec. 17, 1991

[54] SEAL ASSEMBLY FOR A HIGH SPEED MACHINING SYSTEM

[75] Inventor: Richard A. Kostrzewski, Findlay, Ohio

[73] Assignee: Ford Motor Company, Dearborn, Mich.

[21] Appl. No.: 665,852

[22] Filed: Mar. 6, 1991

Related U.S. Application Data

[63] Continuation of Ser. No. 398,877, Aug. 28, 1989, abandoned.

[51] Int. Cl.[5] .................... F16J 15/40; B23B 51/06
[52] U.S. Cl. .......................................... 277/2; 277/27; 277/81 R; 277/85; 408/56; 409/135
[58] Field of Search ............... 277/2, 81 R, 38, 39, 277/40, 85, 87, 93 R, 93 SD, 79, 71, DIG. 8, 28, 29; 408/56, 57; 409/135, 136

[56] References Cited

U.S. PATENT DOCUMENTS

| | | |
|---|---|---|
| 2,509,091 | 5/1950 | Faccou . |
| 2,844,393 | 7/1958 | Jensen . |
| 2,871,039 | 1/1959 | Payne . |
| 2,871,040 | 1/1959 | Payne . |
| 2,964,340 | 12/1960 | Kinzie et al. . |
| 2,985,468 | 5/1961 | Shaw et al. ............... 408/57 |
| 3,278,191 | 10/1966 | Gits et al. . |
| 3,416,808 | 12/1968 | Voitik . |
| 3,552,752 | 1/1971 | Lojkutz . |
| 3,578,344 | 5/1971 | Yost . |
| 3,784,213 | 1/1974 | Voitik . |
| 3,837,658 | 9/1974 | Skinner et al. . |
| 3,895,424 | 7/1975 | Hautau . |
| 4,095,808 | 6/1978 | Glasson . |
| 4,291,887 | 9/1981 | Etsion et al. ............... 277/27 |
| 4,294,317 | 10/1981 | Amoroso . |
| 4,296,935 | 10/1981 | Inouye . |
| 4,304,408 | 12/1981 | Greenawalt . |
| 4,328,973 | 5/1982 | Delbridge . |
| 4,415,165 | 11/1983 | Martini ............... 277/81 R |
| 4,426,092 | 1/1984 | Wiese . |
| 4,463,958 | 8/1984 | Butler . |

(List continue on next page.)

Primary Examiner—William A. Cuchlinski, Jr.
Assistant Examiner—Daniel G. DePumpo
Attorney, Agent, or Firm—Joseph W. Malleck; Clifford L. Sadler

[57] ABSTRACT

A high speed machining system (10) including a machine tool (16) mounted on a hollow shaft (14) rotatable at high speeds and the tool (16) being operable at high feed rates. Liquid cutting coolant (22) flows to the tool (16) through the hollow shaft (14) to flush away debris from the tool (16) and for cooling the system (10). Drive means (18) including windings rotate the shaft (14), which is supported by bearings. The windings and bearings have the characteristic of long life in an environment free of liquid cutting coolant (22). The high speed machining system (10) includes a seal assembly (30) to prevent the liquid (22) from entering the liquid-free environment of the bearings and the windings. The seal assembly (30) includes annular means for urging (52) a stationary sealing face (42) against and in annular contact with a rotating hardened sealing surface (38) to form an annular primary seal (54) for isolating the liquid (22) from the bearings and windings. First means for sealing (66) are positioned between an enlarged diameter portion of an annular face seal (40) and an inner cylindrical wall (60) of an annular retainer (58) to suppress leakage of liquid (22) therebetween. Second means for sealing (68) are positioned between an outer cylindrical wall (62) of the retainer (58) and a bore (56) defined within a housing (12) to form a tertiary seal (68) and suppress leakage of liquid (22) therebetween. In cooperation, the annular primary seal (54) and the secondary and the tertiary seals (68) cooperate to substantially eliminate leakage of liquid (22) outside the seal assembly (30) when the liquid (22) is flowing through the hollow shaft (14) to the machine tool (16) at sufficiently high pressures and volumes to remove debris from adjacent the machine tool (16), and to cool the high speed machining system (10) while the shaft (14) rotates at high speed. In alternate embodiments of the invention, different structures of seal interface are disclosed. Each has the attribute of using the pressure of liquid (22) flowing in the liquid path to augment the annular means (52) for urging the annular face seal (40) against and in annular contact with the hardened sealing surface (38) to form the primary seal (66) therebetween.

17 Claims, 3 Drawing Sheets

U.S. PATENT DOCUMENTS

| | | |
|---|---|---|
| 4,477,088 | 10/1984 | Picard . |
| 4,578,003 | 3/1986 | Eckle ..................................... 408/56 |
| 4,619,458 | 10/1986 | Mitumaru . |
| 4,639,000 | 1/1987 | Warner . |
| 4,659,092 | 4/1987 | Wallace et al. . |
| 4,722,404 | 2/1988 | Evans . |
| 4,832,080 | 5/1989 | Smith, III ............................ 277/27 |

FOREIGN PATENT DOCUMENTS 763718  12/1936  United Kingdom .

SEAL ASSEMBLY FOR A HIGH SPEED MACHINING SYSTEM

This is a continuation of copending application Ser. No. 0/398,877 filed on Aug. 28, 1989, and now abandoned.

1. Field Of Invention

The present invention relates generally to a seal assembly for use in a high speed machining system. More particularly, the present invention relates to the art of preventing leakage of liquid cutting coolant from adjacent a hollow shaft rotatable at high speeds, the liquid flowing at high pressure and volume through the shaft to a machine tool mounted on the shaft.

2. Related Art Statement

In the factory of the future, one of the key roles is played by high speed, computerized numerical control (CNC) machining systems. Such systems include, for example, high speed machines for such operations as drilling, milling, boring, and tapping, which demand aggressive tool feed rates substantially higher than current production requirements. One design objective is to achieve aggressive feed rates without compromising resultant quality in the machined workpiece. In practice, it would be desirable to be able, for example, to drill cast iron without jeopardizing quality at feed rates approaching about 20-30 inches per minute and aluminum at rates approaching about 200-300 inches per minute. Under traditional approaches, feed rates of less than 6 inches per minute only are attainable when drilling cast iron.

To propel shafts upon which machine tools are mounted, high speed motors are used. Operating at speeds of 20,000-40,000 rpm, the shafts drive machine tools which generate at a working surface debris which needs to be transported rapidly away therefrom. In general, the rate at which debris is generated is a function of shaft rotational speed and tool feed rate. Accordingly, the need to remove debris from adjacent the machine tool becomes more acute as shaft speeds and tool feed rates are increased. But the seal assemblies currently available are speed and pressure limited, and have a relatively short service life when operating above these limits.

Another operating problem is to cool critical parts of the high speed machining system in order to keep operating temperatures within acceptable limits, thereby prolonging machine tool, shaft bearing, and motor winding life and avoiding unnecessary down time due to overheating and component failure.

To solve the problems of transporting debris away from the work surface and cooling the machine tool system, liquid cutting coolants are delivered at high pressure and volume through the machine tool system. Generally, the higher the feed rate of the machine tool, the more urgent is the need for a high volume of liquid cutting coolant to be delivered at high pressure to the work site. The twin challenges of debris transportation and tool cooling can be met by delivering the liquid into the vicinity of the machine tool under pressures in excess of about 800-1000 psi and flow rates between about 3 and 10 gallons per minute. But then problems of leakage of liquid cutting coolant begin to emerge. Such problems include damage to shaft bearings and motor windings.

Because the effects of leakage are severe, most machine tooling operations in today's production environment are limited in their feed rate by liquid cutting coolant pressure constraints or by shaft speed considerations. To meet challenges posed by liquid pressure and shaft speed constraints, improvements in seal assemblies are needed, particularly where liquid cutting coolant is injected into the hollow shaft. When operating at high tool feed rates and at elevated liquid coolant flow rates necessary to keep operating temperatures within acceptable limits and effectively transport debris away from the work site, common failures include seal leakage due to the enormous pressures developed under such operational conditions. When seal integrity breaks down, liquid cutting coolant may follow a leak path leading to bearings which support the shaft or to windings in a motor which propels the shaft. In either event, the possibility of expensive, catastrophic failure looms large.

To meet design needs such as those described above, several types of seal assemblies have been provided heretofore. Such approaches have long been recognized and disclosed in, for example, U.S. Pat. No. 4,296,935. This reference discloses a seal for a rotary shaft, the seal including a ring and a seat ring with mating seal faces between liquid inside and outside the seal. However, the '935 references discloses an axial bias spring which is used to urge closure between the ring and the seat ring. The absence of an annular spring can be expected to produce asymmetrical loading between the ring and the seat ring, thereby producing problems associated with uneven wear, noise, and vibration, which would be exacerbated at high rotational speeds. Additionally, problems of delivering sufficient liquid cutting coolant around the outside of the shaft to a machine tool operating at aggressive feed rates remain unsolved by the approach taken in the '935 disclosure.

U.S. Pat. Nos. 3,416,808 and 3,784,213 disclose a sealing surface mounted for rotation with a shaft. However, neither reference discloses the use of a hollow shaft to deliver liquid cutting coolant at high flow rates to a machine tool. Nor do these references disclose a second O-ring between an outer circumferential wall of an annular cup and a housing. The approaches taken in the '808 and '213 references apparently leave unsolved the problems of leakage of liquid from a seal assembly in which the shaft rotates at high speed, and the concomitant deleterious effects of such liquid reaching shaft bearings or an electric motor which propels the shaft. Furthermore, the approaches taken in these references apparently leave unsolved bi-directional flow problems existing beyond the outer cylindrical wall of the annular unit because there is no effective sealing therebetween.

Under conventional approaches such as those described in the previous three references, the problems of coolant leakage and seal failure which are often associated with machining a high output of components at aggressive speeds and feed rates remain unsolved. As speeds and feed rates increase, supplying an exterior coolant to the high speed cutting surface often fails to keep operating temperatures within acceptable limits.

Under these and other conventional approaches, machine tool failure often results from an inability to supply an effective amount of coolant to the machining surface. Further, whenever the flow rate or pressure of coolant, or both are raised, coolant leakage results. There then arises an acute need to protect bearings and motor windings. These and other problems under prior approaches become more evident as the feed rate of machine tools is increased.

To address the needs of advanced manufacturing technology, it would be useful to have a high pressure seal which enables debris from machining to be removed effectively by the coolant. Ideally, the configuration of a seal interface between a seat ring rotating with the shaft and a stationary face seal should be such as to harness the high hydrodynamic pressures associated with the flow of liquid cutting coolant to promote sealing engagement between the rotating seat ring and the stationary face seal. Under such an approach, embodiments exhibiting the desired seal structure would have the attribute of using coolant pressure to urge contact between the rotating seat ring and the face seal. Instead of accepting the problems of pervasive liquid flow in unwanted areas caused by high hydraulic pressure, it would be advantageous to use such pressure to close the seal interface, rather than forcing an opening therethrough.

It would also be desirable to provide a device for detecting the severity and amount of leakage from the seals and for locating a leak site to give an early warning of impending failure of the seal assembly. Such a device would enable an operator to shut down the machining operation before catastrophic and expensive failure results, and before incurring the production delays that are associated therewith.

SUMMARY OF INVENTION

The present invention solves the above problems in high speed machining systems by providing a seal assembly for preventing leakage of liquid cutting coolant from adjacent a shaft rotatable at high speeds, the liquid flowing at sufficiently high pressures and volumes to transport debris away from and cool the machining system.

Included in the seal assembly is a seat ring which is rotatable with the shaft. The seat ring is mounted for rotation at the inlet end of the shaft. An annular face seal is mounted so as to be axially movable in relation to the shaft, but fixed against rotation therewith. The annular face seal is engageable with the seat ring to form an annular primary seal, the primary seal acting as a first ring of resistance to leakage of the liquid cutting coolant. To implement the primary seal, annular means for urging the face seal against and in annular contact with the seat ring is provided.

An axial bore is defined within a housing, which extends toward the seat ring. An annular retainer is accommodated within the bore and has an inner cylindrical wall extending within the annular face seal and an outer cylindrical wall extending along part of the bore. Connecting the inner and outer cylindrical walls of the retainer is an annular end wall which supports the means for urging.

A secondary seal is formed by first means for sealing which is positioned between the annular face seal and the inner cylindrical wall of the annular retainer. The first sealing means is located at another potential leak site, and suppresses the leakage therebetween of liquid which reaches the secondary seal. Second means for sealing are positioned between the outer cylindrical wall of the annular retainer and the bore of the housing to form a tertiary seal at another potential leak site, and suppresses the leakage of liquid therebetween.

Together, the annular primary seal and the secondary and tertiary seals cooperate to substantially eliminate leakage of liquid at potential leak sites when the liquid is flowing to the machine tool at the high pressures and volumes which are sufficient to remove debris from adjacent the tool and to cool the system, while the shaft rotates at high speed.

As disclosed, the seal assembly also includes means for detecting the severity and amount of leakage of the liquid from the seals and means for locating the leak site, thereby providing an early warning of failure of the seal assembly and avoiding catastrophic destruction of shaft bearings and motor windings.

Accordingly, it will be seen that the invention is a high speed machining system, including a seal assembly which prevents liquid cutting coolant from destroying shaft bearings and motor windings.

In alternate embodiments of the invention, different structures of seal interface are disclosed. Each has the attribute of using the pressure of liquid to augment the annular means for urging the annular face seal against and in annular contact with the seat ring to form the primary seal therebetween.

The objects, features, and advantages of the present invention are readily apparent from the following detailed description of the best mode for carrying out the invention when taken in connection with the accompanying drawings.

DESCRIPTION OF PREFERRED EMBODIMENTS

Figure 1:
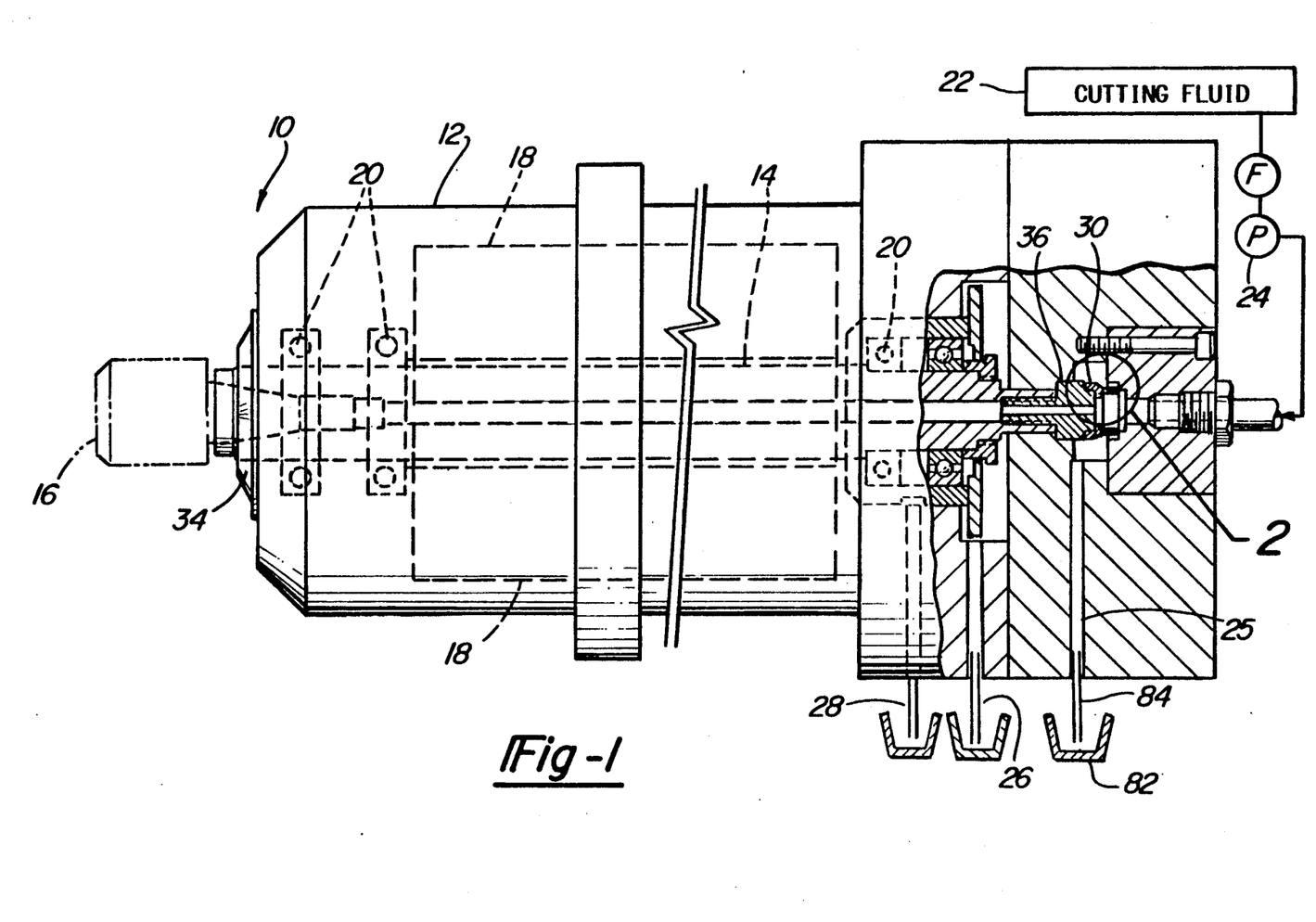
FIG. 1 is an environmental, partially cutaway view of part of a high speed machining system including the seal assembly of the present invention.

With reference to FIG. 1 of the drawings, there is depicted a high speed machining system 10 for performing such operations as drilling, milling, boring, and tapping, comprising a housing 12 enclosing a hollow, rotatable shaft 14. The shaft 14 is supported in, and projects out of the housing 12 for receiving a machine tool 16 which is in driving engagement with the shaft 14. Drive means 18, such as a high speed linear electric motor, are located within the housing 12 for rotating the shaft 14 at speeds up to 20,000-40,000 rpm, which enable the machine tool 16 to operate at high feed rates up to about 200-300 inches per minute. In practice, the drive means 18 extend between the bearing means 20 so that windings associated with the electric motor lie close to each set of bearing means 20 which support the hollow rotatable shaft 14. The bearing means 20, such as aerodynamic, hydrodynamic, precision ball or ceramic bearings, have the characteristic of long life in an environment which is free of liquid cutting coolant 22. The proximity of windings to the bearings 20 calls for protection of the motor windings and shaft bearings from possible seepage of the liquid cutting coolant 22 if the seal assembly 30 breaks down.

To supply the liquid cutting coolant at pressures up to about 800-1000 psi and volumes up to about 10 gallons per minute, means for supplying 24 the liquid 22 to the machine tool 16 through the hollow shaft 14 are provided. The liquid 22 cools the tool 16 and flushes away debris therefrom. As illustrated in FIG. 1, the means 24 for supplying liquid 22 to the machine tool 16 include a filter for removing contaminants from the liquid 22 and for preventing them from reaching the seal assembly 30 and a pump for delivering the liquid 22 along its path. Leading from the pump is a coolant feed line which delivers the liquid 22 to a stationary injector connected to the shaft 14 which is received within the housing 12. After passing through the shaft 14 and flushing debris away from the machine tool 16, the fluid path proceeds through the filter before reentering the pump. Drains 25, 26, 28 are located downstream from potential leak sites and provide an early warning of failure in the seal assembly 30, together with an indication of the location of a potential trouble spot.

Disposed between the liquid supplying means 24 and the drive means 18 is a seal assembly 30 which prevents liquid 22 from entering a liquid-free environment of the bearing means 20 of the rotatable shaft 14 and windings associated with the drive means 18. The seal assembly 30 prevents leakage of the liquid cutting coolant 22 from the hollow shaft 14, even when it rotates at high speeds and the liquid 22 flows at high pressures and volumes. Beginning at an inlet end 32 of the shaft 14, the liquid 22 proceeds therethrough toward the machine tool 16 which is mounted proximate an outlet end 34 thereof. In operation, the liquid 22 transports debris away from the seal assembly 30, thereby cooling the machine tool 16 and the machining system 10, thus prolonging the useful life of critical components thereof without jeopardizing production efficiency and economy.

Figure 2:
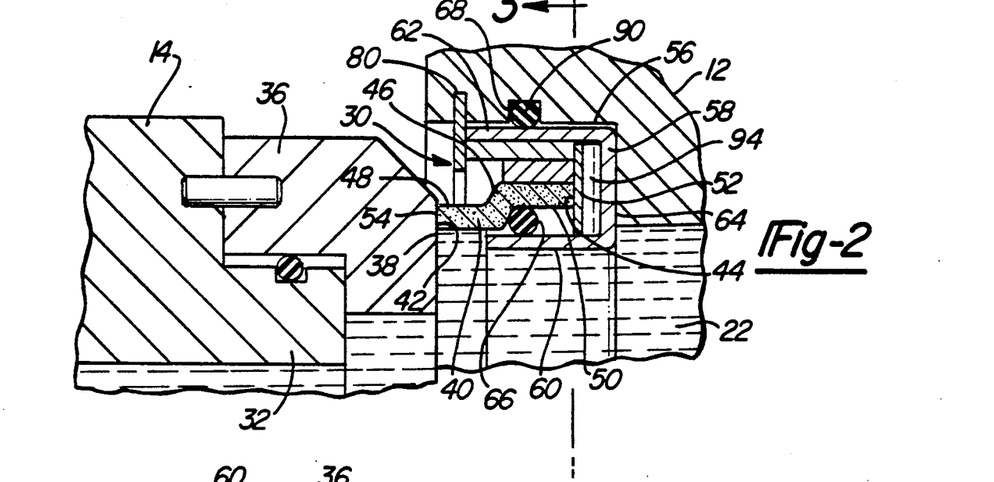
FIG. 2 is a sectional view of an enlarged portion taken from FIG. 1, showing the seal assembly of the present invention.

Turning now to FIG. 2, there is shown an enlarged view of a portion of FIG. 1, in which is depicted a seat ring 36 rotatable with the shaft 14. A hardened sealing surface 38 made of a high carbon steel is provided on the seat ring 36. Both the seat ring 36 and the hardened sealing surface 38 are mounted on the shaft 14 proximate the inlet end 32 thereof. The seat ring 36 is mounted on the shaft 14 in a conventional manner using, for example, a dowel or pin. An O-ring, for example, is situated between the seat ring 36 and the shaft 14 to provide a liquid-tight seal therebetween.

Figures 3, 4:
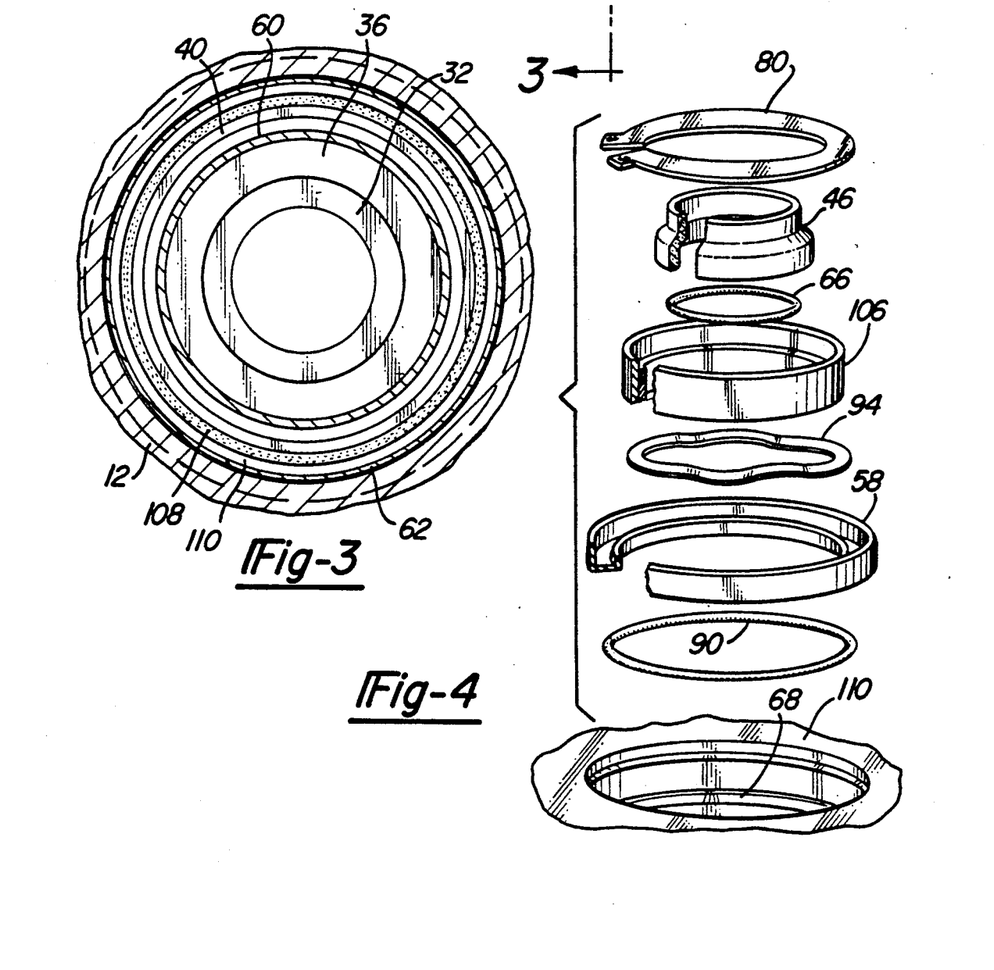
FIG. 3 is a sectional view of the seal assembly of the present invention taken along the line 3—3 of FIG. 2.
FIG. 4 is an exploded perspective view of the seal assembly of the present invention.

Taken together, FIGS. 2-4 are helpful in illustrating the structural inter-relationships between various components of the seal assembly 30, and their relationship to the hollow shaft 14. Fixed against rotation with the shaft 14, an annular face seal 40 of high carbon steel is provided so as to be axially movable in relation to the shaft 14. The annular face seal 40 has a sealing face 42 which is engageable over its annular area with the hardened sealing surface 38. Located opposite from the sealing face 42 is a support face 44, and a stepped cylindrical wall 46 extends therebetween. The stepped cylindrical wall 46 provides a reduced diameter portion 48 adjacent the sealing face 42 and an enlarged diameter portion 50 adjacent the support face 44.

To avoid problems associated with nonuniform contact and uneven wear across a sealing interface, annular means 52 for urging the sealing face 42 of the annular face seal 40 against the hardened sealing surface 38 are provided. The annular means 52 for urging are loaded adjacent the support face 44 of the annular face seal 40. By providing annular contact for the annular primary seal 54, many traditional problems associated with seal design are avoided. For example, it is known that a seal interface can be closed by increasing closure pressure across the seal interface. This, however, frequently results in excessive noise, vibration and wear, together with reduced useful life. By providing an annular area of contact, pressure across the seal interface tends to be relatively uniform, and problems associated with noise, vibration, and short seal life are substantially reduced.

Figure 5:
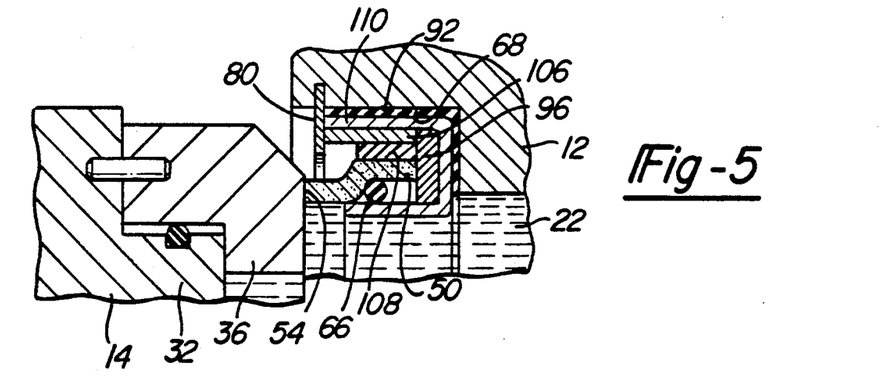
FIG. 5 is a sectional view of a first alternate embodiment of the seal assembly of the present invention, showing an alternate tertiary seal structure.

Turning again to FIG. 2, it will be seen that the housing 12 has an axial bore 56 facing the seat ring 36, and that the bore 56 is in communication with liquid 22 flowing through the hollow shaft 14. Inserted within the bore 56 is an annular retainer 58 that has an inner cylindrical wall 60 which extends within the annular face seal 40. An outer cylindrical wall 62 of the annular retainer 58 extends along part of the bore 56. Connecting the inner 60 and outer 62 cylindrical walls is an annular end wall 64 which supports the urging means 52. In practice, the urging means 52 are embodied in, for example, an annular wave spring 94 as best shown in FIGS. 2 and 4 or a magnet 96, such as a permanent magnet, as shown in FIG. 5. The annular means 52 provide a closure pressure exerted by the sealing face 42 against the hardened sealing surface 38 which is uniform throughout the sealing interface.

First means for sealing 66 form a secondary seal which is positioned between the enlarged diameter portion 50 of the stepped cylindrical wall 46 and the inner cylindrical wall 60. The secondary seal 66 suppresses the leakage of liquid therebetween. In use, the first means for sealing 66 may comprise, for example, a resilient sealing ring, or an "O"-ring. Traditionally, O-rings have been found to be the most economical and common form of seal. However, such rings tend to provide a line, rather than an area of contact, even though they may be rubber-coated for compliance.

An alternate liquid leak path could, in view of the high speeds and pressures involved, be formed between the annular retainer 58 and the bore 56, were it not for a second means for sealing 68 which is located therebetween. The secondary means for sealing 68 forms a tertiary seal 68 between the bore 56 and the annular retainer 58. It has been found that the installation of the tertiary seal 68 significantly reduces leakage problems presented by prior approaches.

Together, the annular primary seal 54, the secondary 66, and the tertiary 68 seals cooperate to substantially eliminate leakage of liquid 22 outside the seal assembly 30 when the liquid 24 is flowing through the hollow shaft 14 to the machine tool 16 at sufficiently high pressures and volumes to remove debris from adjacent the machine tool 16 and to cool the tool while the shaft 14 rotates at high speed.

To constrain the annular urging means 52 and the annular retainer 58 in the axial bore 56 within the housing 12, means 80 for securing the annular face seal 40 are provided. Such securing means 80 may, for example, be embodied in a conventional snap ring retainer.

An early warning of failure of the seal assembly 30 is provided by means 82 for detecting leakage of the liquid 22 from the seals 54, 66, 68. The means for detecting 82 leakage may, for example, comprise a conventional transparent vessel or jar. The detecting means 82 are fluidly connected adjacent the seals 54, 66, 68. Having detected leakage, the problem of locating a leak site are provided by means for locating 84, such as a drain 25, 26, 28, and a transparent pipe, or a tube. The locating means 84 are fluidly connected to the detecting means 82 and the seals 54, 66, 68 so that the leakage detecting 82 and leak site locating means 84 cooperate to identify a source of liquid leakage, thereby providing an early warning of impending loss of integrity of the seal assembly 30.

FIG. 1 depicts the fluid connection or drain 25 between the locating means 84 and the seals 54, 66, 68. The presence of detectible quantities of liquid cutting coolant 22 in the detecting means 82 is a symptom of imminent failure of the seal assembly 30. By affording a low pressure cavity and drain 25 adjacent the seal assembly 30, unwanted pressure build-up of liquid 22 surrounding the seal assembly 30 is avoided. If liquid 22 is able to trace a path toward the bearings 20, then its presence will be evident by inspection of a second drain 26. Additional movement of liquid 22 beyond the second drain 26 toward the windings of the drive means 18 will be evident by inspection of a third drain 28.

Referring now to FIG. 5, there is shown a first alternate embodiment of a seal assembly 30 of the present invention. In this embodiment, a fluoroelastomer, or a rubber-like compound 92 forms a base coating which is molded or sprayed onto the annular retainer 58. Such a compound may, for example, resemble that defined by ASTME specification number ESE-M2D338-A1. In practice, the fluoroelastomer 92 may be disposed outside the outer cylindrical wall of the annular retainer 58, or its annular end wall 64 or outside both walls.

The provision of the fluoroelastomer 92 as the second means for sealing 68 to provide the tertiary seal 68 produces superior sealing results due to an increase in the area of the sealing surface. Additionally, use of fluoroelastomers helps avoid problems which are often associated with installation of O-rings as seals because of improper installation and consequent damage. However, the use of the fluoroelastomers as the tertiary seal 68 requires that the machining of the bore 56 in the housing 12 be controlled to about 60-125 rms. This quality of surface finish is not usually required with O-ring embodiments.

Figure 6:
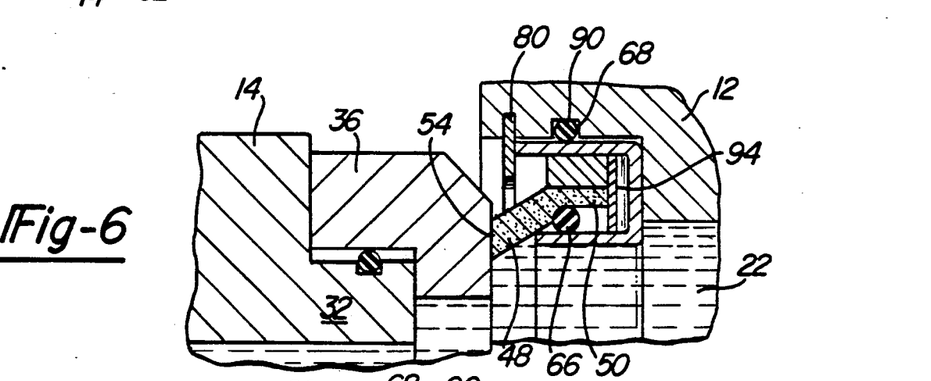
FIG. 6 is a sectional view of a second alternate embodiment of the seal assembly of the present invention, showing a first alternate primary seal structure.
Figure 7:
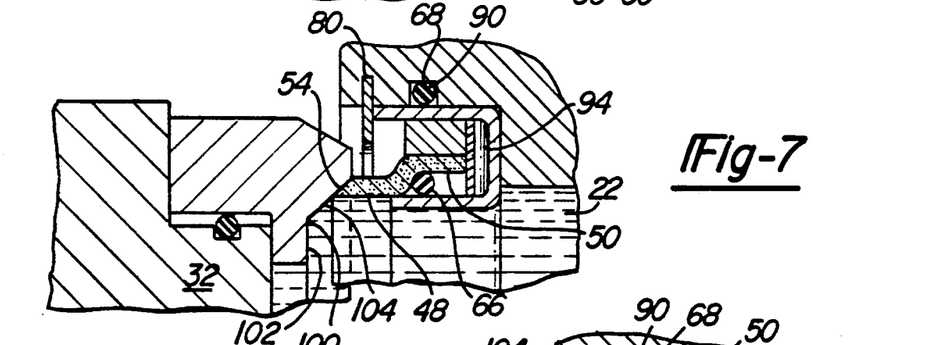
FIG. 7 is a sectional view of a third alternate embodiment of the seal assembly of the present invention, showing a second alternate primary seal structure.
Figure 8:
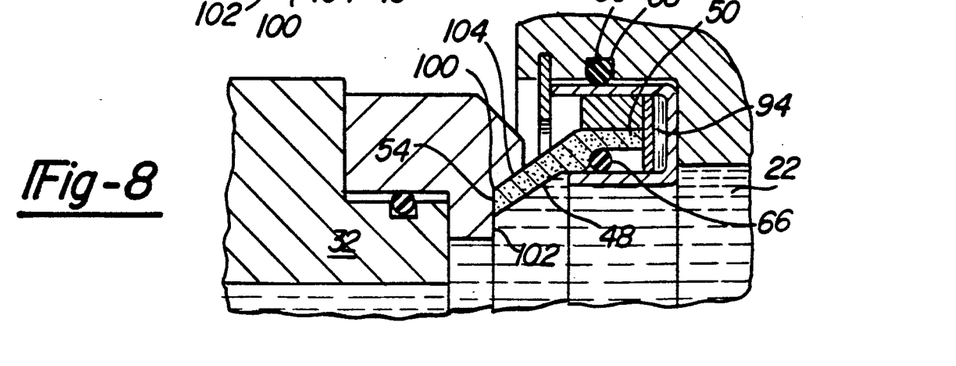
FIG. 8 is a sectional view of a fourth alternate embodiment of the seal assembly of the present invention, showing a third alternate primary seal structure.

Turning now to FIGS. 6-8, it will be seen that alternative structures of primary seal interface are disclosed and are considered to be within the scope of the present invention. In FIG. 6, for example, a second alternative embodiment is illustrated, in which the reduced diameter portion 48 of the annular face seal 40 has a diameter which lessens toward the sealing face 42. In this embodiment, the reduced diameter portion 48 is inclined relative to the hardened sealing surface 38 and the sealing face 42 is disposed in a face-to-face relationship with the hardened sealing surface 38. This seal structure has the attribute of harnessing the pressure of liquid 22 flowing in the liquid path to augment the annular means 52 of urging the sealing face 42 of the annular face seal 40 against and in annular contact with the hardened sealing surface 38. The resultant of hydrodynamic forces exerted upon the inclined reduced diameter portion 48 has a component lying perpendicular to the hardened sealing surface 38. This perpendicular component serves to close a gap between the sealing face 42 of the annular face seal 40 and the hardened sealing surface 38 of the seat ring 36. It will be appreciated, as noted earlier, that the primary seal 54 is annular and has the attribute of distributing wear characteristics evenly and promoting the useful life of the seal assembly 30.

A third alternative embodiment of primary seal structure is depicted in FIG. 7. In this embodiment, the hardened sealing surface 38 of the seat ring 36 is provided with an annular notch 100. The notch 100 has a generally radially extending first surface 102 and a second surface 104 inclined thereto. To complement the annular notch 100, the sealing face 42 is adapted to mate with the second surface 104. In cooperation, the annular notch 100 and the annular face seal 40 cooperate to form therebetween the primary seal 54. As in the previous embodiment, the pressure of liquid 22 augments the annular means 52 for urging the sealing face 42 of the annular face seal 40 against and in annular contact with the hardened sealing surface 38.

In a fourth alternate embodiment of seal structure shown in FIG. 8, hydrodynamic forces exerted by the liquid 22 are utilized effectively in promoting integrity of the seal assembly 30. In this embodiment, the sealing face 42 of the annular face seal 40 is adapted to mate with the first surface 102. Additionally, part of the reduced diameter portion 48 is adapted to mate with the inclined second surface 104 of the annular notch 100. In this configuration, the resultant of hydrodynamic forces exerted by the liquid 22 have components which lie perpendicular to both the first 102 and second 104 surfaces. These components, together with the annular means 52 for urging combine to produce an effective primary seal 54 having the characteristics of even wear and long life.

Having discussed the primary seal alternative embodiments of FIGS. 6-8, it will readily be seen that the alternate embodiment of the tertiary seal depicted in FIG. 5 can be used to good effect in combination with any of the embodiments of primary seal structure disclosed in FIGS. 6-8.

Turning back now to FIGS. 2 and 5-8, it will be appreciated that means for spacing 106 may be interposed between the enlarged diameter portion 50 of the annular face seal 40 and the outer cylindrical wall 62 of the annular retainer 58. The spacing means 106 serve to locate the sealing face 42 of the annular face seal 40 relative to the hardened sealing surface 38 of the seat ring 36. By selecting different means for spacing 106, such as variously sized annular collars in combination with annular face seals 40 of different diameters, different locations of a wear surface on the hardened sealing surface 38 of the seat ring 36 can be selected.

The embodiments illustrated in FIGS. 6-8 contemplate the use of singular spacing means 106. The spacing means 106 may, as illustrated in FIGS. 2 and 5, comprise a first spacing ring 108 disposed exteriorly of the enlarged diameter portion 50 of the annular face seal 40 and a second spacing ring 110 interposed between the first spacing ring 108 and the outer cylindrical wall 62 of the annular retainer 58. In these embodiments, the axial length of the first spacing ring 108 is approximately equal to the axial length of the enlarged diameter portion 50, and the length of the second spacing ring 110 approximates that of the outer cylindrical wall 62.

In summary, the high speed machining system 10 and seal assembly 30 disclosed herein meets many of the challenges posed by advanced manufacturing technologies in the factory of the future, which require aggressive feed rates of machine tools. Such challenges are met by delivering the liquid cutting coolant 22 through the hollow rotatable shaft 14 on which the machine tool 16 is mounted through the seal assembly 30. By utilizing an annular primary seal 54 in combination with secondary 66 and tertiary 68 seals, integrity of the seal assembly 30 is promoted and made long lasting. The otherwise potentially damaging effects of hydrodynamic forces exerted by the liquid cutting coolant 22 are redirected to promote rather than destroy a sealing interface. As a result, the structure seal assembly 30 disclosed is effective at high rotational speeds of the shaft 14 and at elevated liquid flow rates. By providing leakage detection 82 and locating means 84, an early warning of impending failure is provided, thereby affording to the operator the opportunity to avoid expensive, catastrophic failure and its unwanted effects on production processes. Thus, the high speed machining system 10 and seal assembly 30 provide a means for producing components in high volumes without sacrificing quality or reliability.

It is apparent that there has been provided in accordance with the invention a high speed machining system 10 and a seal assembly 30 which addresses the needs and solves the problems remaining from conventional practices. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the following claims.

What is claimed is:

1. A seal assembly for preventing leakage of liquid cutting coolant in a high speed machining system from a shaft rotatable at high speeds, the shaft having a hollow passage extending longitudinally therethrough, the liquid flowing at high pressure and volume through said passage and past a machine tool mounted on the shaft, the seal assembly including:

a seat ring mounted on the shaft and being rotatable therewith;

an annular face seal axially movable in relation to the shaft, but fixed against rotation therewith, said annular face seal being engageable with said seat ring and being configured with a reduced diameter portion where said face seal is engageable with said seat ring and an increased diameter portion spaced from said seat ring;

annular means for urging said annular face seal against and in annular contact with said seat ring to form an annular primary seal, said means for urging being loaded adjacent said annular face seal;

a housing having an axial bore extending toward said seat ring;

an annular retainer having an outer cylindrical wall extending along part of said bore, and an inner cylindrical wall extending within said annular face seal, said annular retainer supporting said means for urging;

first means for sealing positioned between the increased diameter portion of said annular face seal and said annular retainer to form a secondary seal and defining with said annular face seal a cavity in communication with the liquid cutting coolant for exposing said reduced diameter portion to the high pressure of said coolant, said first sealing means suppressing the leakage of liquid between said annular face seal and said annular retainer; and second means for sealing positioned between said annular retainer and said bore to form a tertiary seal, said second sealing means suppressing the leakage of liquid therebetween, whereby said annular primary seal, said secondary and said tertiary seals cooperate to substantially eliminate leakage of liquid outside the seal assembly and to augment said annular means for urging said annular face seal against said seat ring while the shaft rotates at high speed and when the liquid flows at sufficiently high pressures and volumes to remove machining debris and to cool the system and while the coolant is communicating with said cavity.

2. The seal assembly of claim 1, further comprising: means for securing said annular face seal, said annular urging means and said annular retainer within said housing, said means for securing engaging said outer cylindrical wall of said annular retainer within said axial bore.

3. The seal assembly of claim 1, further comprising: means for detecting leakage of the liquid from said seals, said leakage detecting means being fluidly connected to a potential leak site; and means for locating said leak site, said locating means being fluidly connected to said detecting means and to said potential leak site, so that said leakage detecting and locating means cooperate to identify a site of liquid leakage, thereby providing an early warning of failure of the seal assembly.

4. The seal assembly of claim 3, wherein said means for locating a leak site are fluidly connected proximate said seals.

5. The seal assembly of claim 3, wherein said means for locating a leak site are fluidly connected proximate bearing means for supporting the shaft.

6. The seal assembly of claim 3, wherein said means for locating a leak site are fluidly connected proximate drive means for propelling the shaft.

7. The seal assembly of claim 1, wherein said first means for sealing comprises a resilient sealing ring.

8. The seal assembly of claim 1, wherein said second means for sealing comprises a resilient sealing ring.

9. A seal assembly of claim 1, wherein said first and said second means for sealing comprise resilient sealing rings.

10. The seal assembly of claim 1, wherein said second means for sealing comprises a fluoroelastomer.

11. The seal assembly of claim 10, wherein said annular retainer is provided with an annular end wall extending between said inner and outer cylindrical walls and said fluoroelastomer extends between said outer cylindrical wall, said annular end wall, and said bore of said housing.

12. The seal assembly of claim 1, wherein said annular means for axially urging said annular face seal against and in annular contact with said seat ring comprises an annular wave spring.

13. The seal assembly of claim 1, wherein said seat ring is provided with an annular notch having a generally radially extending first surface and a second surface inclined thereto, said annular face seal being adapted to mate with said second surface, the pressure of liquid augmenting said annular means for urging said annular face seal against and in annular contact with said seat ring.

14. The seal assembly of claim 1, wherein said seat ring is provided with an annular notch having a generally radially extending first surface and a second surface inclined thereto, said annular face seal being adapted to mate with said first surface, part of said reduced diameter portion being adapted to mate with said second surface.

15. The seal assembly of claim 1, further comprising: means for spacing interposed between said annular face seal and said annular retainer.

16. A high speed machining system comprising:
a housing enclosing a hollow, rotatable shaft supported in said housing and projecting outwardly therefrom for receiving a machine tool mounted in driving engagement with said shaft;
drive means mounted within said housing for rotating said shaft at high speed to enable said machine tool to operate at high feed rates, said drive means including windings and said shaft having bearing means, said windings and said bearing means having the characteristic of long life in an environment free of liquid cutting coolant;
means for supplying said liquid to said machine tool through said hollow shaft for flushing away debris from said tool and for cooling the system; and
a seal assembly disposed between said liquid supplying means and said drive means to prevent said liquid from entering the liquid-free environment of said bearing means of said shaft and said windings of said drive means, said seal assembly having:
a seat ring mounted on said shaft and being rotatable therewith;
an annular face seal axially movable in relation to said shaft, but fixed against rotation therewith, said annular face seal being engageable with said seat ring, said annular face seal being configured with a reduced diameter portion where said face seal is engageable with said seat ring and an increased diameter portion spaced from said seat ring;
annular means for urging said annular face seal against and in annular contact with said seat ring to form an annular primary seal, said means for urging being loaded adjacent said annular face seal;
an axial bore defined within said housing, said bore extending toward said seat ring;
an annular retainer having an outer cylindrical wall extending along part of said bore, and an inner cylindrical wall extending within said annular face seal, said annular retainer supporting said means for urging;
first means for sealing positioned between the increased diameter portion of said annular face seal and said annular retainer to form a secondary seal, and defining with said annular face seal a cavity in communication with the liquid cutting coolant for exposing said reduced diameter portion to the high pressure of said coolant, said first sealing means suppressing the leakage of liquid therebetween; and
second means for sealing positioned between said annular retainer and said bore to form a tertiary seal, said second sealing means suppressing the leakage of liquid therebetween,
whereby said annular primary seal, said secondary and said tertiary seals cooperate to substantially eliminate leakage of liquid outside said seal assembly and to augment said annular means for urging said annular face seal against the seat ring while said shaft rotates at high speed and when the liquid flows at sufficiently high pressures and volumes to remove machining debris and to cool the system and while the coolant is communicating with said cavity.

17. A high speed machining system comprising:
a housing enclosing a hollow, rotatable shaft supported in said housing and projecting outwardly therefrom for receiving a machine tool mounted in driving engagement with said shaft;
drive means mounted within said housing for rotating said shaft at high speed to enable said machine tool to operate at high feed rates, said drive means including windings and said shaft having bearing means, said windings and said bearing means having the characteristic of long life in an environment free of liquid cutting coolant;
means for supplying said liquid to said machine tool through said hollow shaft for flushing away debris from said tool and for cooling the system; and
a seal assembly disposed between said liquid supplying means and said drive means to prevent said liquid from entering the liquid-free environment of said bearing means of said shaft and said windings of said drive means, said seal assembly having:
a seat ring mounted on said shaft and having a hardened sealing surface, said seat ring and said hardened sealing surface being mounted on said shaft proximate the inlet end thereof;
an annular face seal axially movable in relation to the shaft, but fixed against rotation therewith, said annular face seal being engageable with said seat ring, said annular face seal being configured with a reduced diameter portion where said face seal is engageable with said seat ring and an increased diameter portion spaced from said seat ring;
annular means for urging said face seal against and in annular contact with said seat ring to form an annular primary seal, said means for urging being loaded adjacent said annular face seal;
said housing having an axial bore facing said seat ring;
an annular retainer having an outer cylindrical wall extending along part of said bore, and an inner cylindrical wall extending within said annular face seal, said annular retainer supporting said means for urging;
first means for sealing positioned between the increased diameter portion of said annular face seal and said annular retainer to form a secondary seal, and defining with said annular face seal a cavity in communication with the liquid cutting coolant for exposing said reduced diameter portion to the pressure of said coolant, said first sealing means suppressing the leakage of liquid therebetween;
second means for sealing positioned between said annular retainer and said bore to form a tertiary seal, said second sealing means suppressing the leakage of liquid therebetween,
whereby said annular primary seal, said secondary and said tertiary seals cooperate to substantially eliminate leakage of liquid outside the seal assembly and to augment said annular means for urging said annular face seal against said seat ring when said liquid is flowing through said hollow shaft to said machine tool at sufficiently high pressures and volumes to remove debris from adjacent said tool and to cool the system and while said shaft rotates at high speed and while the coolant is communicating with said cavity;

means for securing said annular face seal, said annular urging means and said annular retainer in said axial bore within said housing;

means for detecting leakage of the liquid from said seals, said leakage detecting means being fluidly connected to one or more leak sites; and means for locating said one or more leak sites, said locating means being fluidly connected to said detecting means and said leak sites, so that said leakage detecting and leak site locating means cooperate to identify a site of liquid leakage, thereby providing an early warning of failure of the seal assembly.

* * * * *